0

United States Patent
Markhovsky et al.

(10) Patent No.: US 7,423,580 B2
(45) Date of Patent: Sep. 9, 2008

(54) METHOD AND SYSTEM OF THREE-DIMENSIONAL POSITIONAL FINDING

(75) Inventors: Russ Markhovsky, Edgewater, MD (US); Evgenii Vityaev, Novosibirsk (RU); Evgenii Mikhienko, Novosibirsk (RU)

(73) Assignee: Invisitrack, Inc., Annapolis, MD (US)

( * ) Notice: Subject to any disclaimer, the term of this patent is extended or adjusted under 35 U.S.C. 154(b) by 328 days.

(21) Appl. No.: 11/375,161

(22) Filed: Mar. 14, 2006

(65) Prior Publication Data

US 2006/0256001 A1 Nov. 16, 2006

Related U.S. Application Data

(60) Provisional application No. 60/661,994, filed on Mar. 14, 2005.

(51) Int. Cl.
  *G01S 13/42* (2006.01)
(52) U.S. Cl. .................. 342/126; 342/146; 340/539.13; 340/573.4; 340/572.1; 340/539.32; 455/456.1; 455/550.1
(58) Field of Classification Search .................. 342/42, 342/46, 47, 50, 52, 56–58, 118, 125, 126, 342/146; 340/539.13, 573.4, 572.1, 539.32; 455/456.1, 550.1
See application file for complete search history.

(56) References Cited

U.S. PATENT DOCUMENTS

| | | | | |
|---|---|---|---|---|
| 7,190,309 | B2 * | 3/2007 | Hill | 342/465 |
| 7,327,306 | B2 * | 2/2008 | Laroche | 342/126 |
| 7,359,719 | B1 * | 4/2008 | Duffett-Smith et al. | 455/456.6 |
| 2003/0146871 | A1 * | 8/2003 | Karr et al. | 342/457 |
| 2005/0020279 | A1 * | 1/2005 | Markhovsky et al. | 455/456.1 |
| 2006/0012476 | A1 * | 1/2006 | Markhovsky et al. | 340/539.32 |
| 2006/0256001 | A1 * | 11/2006 | Markhovsky et al. | 342/146 |
| 2008/0100706 | A1 * | 5/2008 | Breed | 348/143 |

* cited by examiner

*Primary Examiner*—John B Sotomayor
(74) *Attorney, Agent, or Firm*—Bardmesser Law Group

(57) ABSTRACT

The present invention is an RF system and methods for finding a target T in three dimensional space configured to have a transponder disposed on the target T, a monitoring unit configured as a transceiver for determining or monitoring the location of the target T and an RF wireless communication system configured with a processor to repeatedly determine position, communication and other values between the transponder and monitoring unit and so as to generate a measured distance between units in three dimensional space by determining the measured distance of the target T by a spherical virtual triangulation relationship when successive values of said position information has a predetermined logical relationship relative to said previous values between said monitoring unit and transponder and/or slave unit disposed on the target T.

4 Claims, 3 Drawing Sheets

METHOD AND SYSTEM OF THREE-DIMENSIONAL POSITIONAL FINDING

BACKGROUND OF THE INVENTION

1. Field of the Invention

The present invention relates generally to radio frequency (RF) locator systems and techniques and, more particularly, to a method and system of tracking, locating and determining the location of people and/or objects in three-dimensional space with a minimal or no fixed infrastructure.

2. Description of the Related Art

Most systems for locating a subject in three-dimensional space employ the use of heavy infrastructure such as a global positioning system to determine the position of the object. However, such locating systems are characterized by shortcomings associated with the power requirements and expensive infrastructure such as satellites that generate signals to determine the position using four signals from separate sources. As a result, such prior art methods and systems are not suitable to find, track and locate people and objects in a three-dimensional environment with minimal or no fixed infrastructure, for example, searching and finding emergency workers in a three dimensional environment buildings, structures, terrain and other locations. The present invention advantageously provides location information in a three dimensional environment without a large, expensive infrastructure.

Typical radio frequency RF systems do not have a reduced system infrastructure, which suffers from disadvantages including requirements of setting up fixed RF reference points, antenna size, range and RF wavelength, whereby signal interference and degradation have limited the development of small power, compact RF systems to search, locate and track objects in three-dimensions. Such factors require additional devices and installation costs that have limited the deployment of RF location systems in a three-dimensional environment. As a result there is a long-felt need for a three-dimensional system having reduced fixed reference points that can be produced at a lower cost. Reducing fixed reference points also has advantages of enabling a system to be deployed immediately and quickly in multiple environments, including harsh environments such as in fire and rescue operations without extensive set up and or installation requirements.

SUMMARY OF THE INVENTION

Insert Final Versions of Broadest System and Method Claims

DESCRIPTION OF THE DRAWINGS

These and other advantages of the present invention are best understood with reference to the drawings, in which.

DETAILED DESCRIPTION OF THE PREFERRED EMBODIMENT

Figure 1:
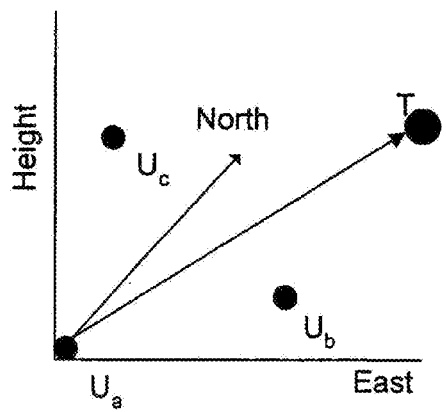
FIG. 1 is a diagram illustrating a method RF mobile tracking and locating system where the operators and targets are rendered in three dimensional space as provided by an embodiment of the present invention.

Referring to FIG. 1 there is shown a method and system for finding in three-dimensional space. A system is established between a device and an object and/or person and controlled by inputs related to positions of the device relative to the object. All operators of the device can be mobile. While numerous devices may be employed, each of at least three master devices as is described herein is necessary to accomplish locating targets in three dimensional spaces.

According to the system of the present invention, the system can locate the object or target T in three dimensional spaces. Master Units can be used to track, locate, and monitor persons and objects, each of which is equipped with a tag and/or Master Unit. The hardware components and software can be integrated into a device or a module that can be attached or integrated with a proprietary device, PDA, GPS device, laptop, cell phone, two way radio and other existing devices (together, the resulting enabled unit will be referred to as the "device" or "Device"). The Devices can operate on any frequency from lower frequencies, including frequencies in the 100 mhz, 200 mhz, 400 mhz, 900 mhz, 2.4 ghz frequencies. All operators of the Device can be mobile. Each mobile Device and slave also may have a compass, pedometer and altimeter. Each master unit and tag has its own ID, and can include additional information such as data about the person or item that is tagged. The information can also include data that can substitute the information that a compass, pedometer, and altimiter can provide. A base unit broadcasts RF signals, which are returned by the tags. The tags can be active tags (battery powered) or passive tags (powered by the base unit or some other source). The master units identify the tagged object and can graphically display location information, including both distance and direction, allowing the user to quickly and easily view the objects being tracked or pass information to other devices that can centralize the information.

A search process, which can be implemented by software, utilizes three or more devices that can run the software. The software has the search methods that enable the Devices it runs on to find and locate other devices running the software. Devices can also be equipped with a compass, pedometer and altimeter device. Control software to search, find and locate the targets in three dimensional spaces. Methods are disclosed to use the device to search, find and locate the object or person in three dimensional spaces. A search process, which can be implemented by software, utilizes three or more Devices that can run the software that embodies the search methods described below.

According to various exemplary embodiments of the method of the present invention, a process to search, locate, and track targets is described according to the following examples of finding techniques:

1. Three mobile operators tracking a target.
2. A combination of three of the group of stationary and mobile operators:
3. All operators are mobile and are not equipped with pedometer and/or altimeter:
4. All operators are Mobile and searching/tracking target inside building:

5. A single searching/tracking mobile operator and three stationary operators inside building or other three dimensional environments:
6. A special case for a search/tracking mobile operator and two stationary operators inside building:

In each of these exemplary embodiments control software can be implemented as is detailed herein so as to implementation the process for finding, locating, searching and tracking other targets. An option that improves accuracy includes running multiple techniques at the same time, sequentially (for example, running two methods and averaging the results) or depending on user preference or environment and, for example, complimentary techniques that include virtual triangulation that is set forth in U.S. Pub. No. 20050020279 A1; where the user would be able to locate the tagged person or item once they reach the desired floor. The use of more than three networked units will improve accuracy. The networking can occur through multiple methods that include fixed wire and wireless mesh networking, such as Zigbee.

EXAMPLE (1)

Of Three Dimensional Mobile Finding

As shown in FIG. 1, there is shown elements of users and device components searching, tracking and locating a target T. A system provided by an embodiment of the present invention for locating, monitoring and or tracking of targets (T) that can be animate or inanimate, or both. In this exemplary embodiment, each of the users or operators can be mobile. Each of the users has a system utilizes one or more of a compass, pedometer, and/or altimeter, or alternatively, another device, method or input that provides comparable information to each unit. In this system, each of the units disposed on the targets to be found and/or tracked also are equipped with altimeter or device to provide such comparable information.

At least three users $U_a$, $U_b$, and $U_c$ are initially positioned randomly in three dimensional coordinate spaces relative to the target T such as, for example, users $U_a$, $U_b$, and $U_c$ are positioned relative to North and East quadrants with the target at a height relative to each. It is appreciated that the position of target T can be displayed on a plane and its vertical coordinate value separately, for example, as a number or circle, etc. Certain initial conditions are configured in this three dimensional coordinate space relative to the target T in a manner that is logical to the users $U_a$, $U_b$, and $U_c$:

1. It is useful to establish a "natural" system of directional coordinates on plain relative to the users such as North-South, East-West, and a third coordinate relative to the height or altitude of the target T, such as, for example, density altitude, MSA or the height above the sea level as can be measured by the altimeter.
2. Each of the tracked target(s) is equipped with a slave unit transponder having an altimeter configured to generate signals of altitude or some other device or method to provide comparable altitude information.
3. Each of the master units used by the users $U_a$, $U_b$, and $U_c$ are equipped with altimeter, compass and pedometer or, alternatively, the user has an alternative means of determining the distanced the master unit travels, relative height and direction.
4. An origin or starting point is calibrated relative to each of the master units used by the users $U_a$, $U_b$, and $U_c$ and the origin coordinates are stored in the natural system of coordinates so as to be known as an initial reference condition.
5. Each of the users $U_a$, $U_b$, and $U_c$ having master units are mobile, whereby each master unit of users $U_a$, $U_b$, or $U_c$ is capable of measuring or otherwise calculating and storing a distance the master unit travels as well as the direction or bearing of a user's $U_a$, $U_b$, or $U_c$ movement relatively to one axis of the configured natural system of directional coordinates, for example, the North axis.

Figure 2:
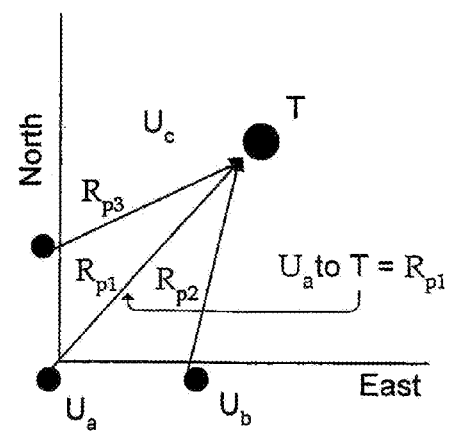
FIG. 2 is a top view diagram illustrating RF mobile tracking and locating system where the operators and targets are rendered in two dimensional space as provided in FIG. 1.

Now making reference to FIGS. 1 and 2, the users $U_a$, $U_b$, and $U_c$ are represented as points in three dimensional coordinate space relative to the target T, whereby the "North" axis is configured as a reference axis. The reference axis is useful to measure or calculate the target T coordinates and the bearing of a user's $U_a$, $U_b$, or $U_c$ movement relative to the "North" axis and the target T. Such measurement advantageously can be calculated by projecting points of the user's $U_a$, $U_b$, or $U_c$ onto the natural plane relative to the target T from the three dimensional coordinate space, thereby calculating the target T coordinates on such natural plane so as to determine the bearing of operator movement toward the target T such as, for example, relatively to the "North" axis.

According to a first mobile finding technique and method of the present invention, a user $U_a$, $U_b$, or $U_c$ can be designated the monitoring Unit that is searching and/or tracking the target T in a search operation. Advantageously, the present invention can be configured so that all users $U_a$, $U_b$, and $U_c$ can be utilized as monitoring units (Devices 1, 2 and 3 herein) according to another embodiment of the present invention. In the first mobile finding technique the target T is projected into the two dimensional natural plane after the units disposed on users $U_a$, $U_b$, and $U_c$ are normalized. After normalization, which can be initiated at initial power on or entering the finding mode, the mobile finding method precedes utilizing the following steps:

1. The master monitoring unit (device 1), in this example user $U_a$, periodically measures a distance $R_1$ relative to the target T with reference to the North axis. As a safeguard for further calculations, if the distance D to target T from the user $U_a$ exceeds a predetermined threshold "D", the master monitoring unit (device 1) can be configured to notify user $U_a$ to recalibrate and/or normalize and then begin again, for example, at a zero height setting.
2. Master monitoring operator $U_a$ enables (monitoring device 20) in a search/track mode and device 1 will transmit to other two monitoring devices (device 2 and device 3) the unique RF identification number of the target T being searched for and/or tracked.
3. Monitoring devices 2 and 3 will determine the corresponding distances to the target, i.e. $R_2$ and $R_3$, the height values of users $U_b$, and $U_c$, having devices 2 and 3 disposed thereon, the coordinates values $(X_{21}, X_{22})$, $(X_{31}, X_{32})$ projected on the plane.
4. Master monitoring user $U_a$ enables device 1 to send a request to the slave unit disposed on target T for it to read the altimeter value corresponding to the target's T height.
5. Slave unit disposed on target T transmits to device 1 of the monitoring operator $U_a$ a signal corresponding to the value of the target "height" from the altimeter.
6. From such value, the target T and positions of users $U_a$, $U_b$, and $U_c$ are "projected" on the natural plane, whereby all coordinates in a third dimension or height are made equal to zero. This compression essentially creates radii $R_1$, $R_2$ and $R_3$ from devices 1, 2 and 3. From such radii $R_1$, $R_2$ and $R_3$ and such corresponding height values of users $U_a$, $U_b$, and $U_c$ and target T the "projected" distances between each of users $U_a$, $U_b$, and $U_c$ and the target T and can be calculated, for example, distance values $R_{p1}$, $R_{p2}$, and $R_{p3}$ will be calculated.

7. From user $U_a$, $U_b$, and/or $U_c$ coordinates projected on the plane having values $(X_{11}, X_{12})$, $(X_{21}, X_{22})$, $(X_{31}, X_{32})$ and distance values $R_{p1}$, $R_{p2}$, and $R_{p3}$ the target coordinates $(X_1, x_2)$ can be calculated or otherwise determined.

8. Master monitoring user's $U_a$ device enables then calculates a bearing toward the target T using a coordinate axis, for example, relatively to "North" axis. Thereafter, the device 1 can prompt user's $U_a$ with direction.

9. Master monitoring user $U_a$ begins a new movement in a particular direction. For an accurate determination of user $U_a$ coordinates, device 1 recalculates. For example, after user $U_a$ moves a certain distance such user's $U_a$ (1) height (the third coordinate) and (2) bearing or angle of movement relatively to the "North" axis is determined to update the coordinates of user $U_a$ such as, for example, after every 1 meter of movement. Advantageously, such technique takes into account any landscape profile as is set forth in FIG. 3 and the Examples below.

10. During movement of user $U_a$ device 1 can be configured to process, compute or otherwise determine the difference between user $U_a$ projections in the coordinate natural plane. Device 1 can prompt user $U_a$ when a predetermined distance is reached (R), for example 10 meters.

11. At this point, the device 1 of master monitoring user $U_a$ can be configured to in the searching and/or tracking can notify any other devices of its position, for example, devices 2 and 3, whereby device 1 makes distance measurements and can send requests to other devices 2 and device 3 to measure their distances.

12. Upon receiving such request devices 2 and 3 perform distance measurements to target T for (1) height and (2) position; sending a value and coordinate data of coordinates values of each of users $U_b$, and $U_c$ to device 1 of $U_a$.

13. Device 1 of $U_a$ repeats one or more of the steps of process paragraphs 4-10 and thereafter prompts device 1 of $U_a$ for a new bearing angle.

14. Upon such prompt, $U_a$ changes its direction of movement so as to create another set of coordinate point as reference.

15. Steps 4-14 can be repeatedly or iteratively until the target T is found or otherwise located.

Tracking Method According to First Finding Technique

According to another exemplary embodiment the method of the present invention, a process for searching in the natural two dimensional space is described, for example, after points are determined by projecting onto the plane. The projected points of the target T into the natural plane will have coordinate values $(X_{11}, X_{12})$, $(X_{21}, X_{22})$, $(X_{31}, X_{32})$ and distance values $R_{p1}$, $R_{p2}$, and $R_{p3}$ with the target coordinates $(X_1, X_2)$ are projected using the above procedures.

Figure 3:
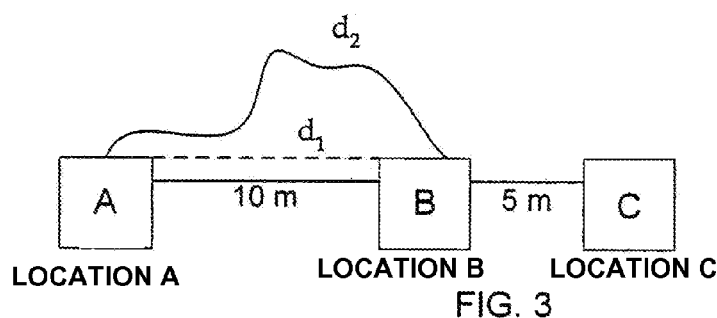
FIG. 3 is a block diagram illustrating RF mobile tracking and locating system take into account a landscape profile.

A profile tracking method modifies the procedures used in the above-identified First Example of Three Dimensional Mobile Finding to create a process of searching/tracking in two-dimensional space. The third coordinate (height) is used to take into account the landscape profile as shown in FIG. 3. For example, if the user $U_a$ moves directly from a place A to place B an altitude factor is introduced by the terrain.

As is illustrated in FIG. 3, the actual distance $d_1$ traveled between places A and B is variable, as follows; a direct line between places AB is 10 meters, as is shown by broken line AB. Alternatively, a longer distance $d_2$ is actually traveled along solid line AB between places A and B. As a result, the length of the solid line AB is greater than the length of the direct route broken line AB, which reflects the actual operator travel and the landscape profile such as, for example, it is larger such as 15 meters. Thus, the accuracy of determining the coordinates of point C will be impacted, unless the operator device will keep updating coordinates every 1-meter, using the height measurements.

For example, in case of an obstacle or terrain so as to take the most efficient path, the user $U_a$ switches the monitoring or master unit to manual control. The user $U_a$ With help of compass determines the angle under which he is going to move in order to bypass the obstacle. The user $U_a$ moves along relatively straight lines and, prior to any direction changes, The user $U_a$ inputs via an input such as a button to the monitoring unit an angle as to the direction the user is going to be moving (relative to the "North" axis) so as to enable the monitoring unit to compute or keep track of the user's $U_a$ coordinates.

An exemplary method of to take the most efficient path around an obstacle or terrain can be described as follows to take advantage of following techniques that improve performance:

1. In case of an obstacle or terrain so as to take the most efficient path, the user $U_a$ switches the monitoring or master unit to manual control. The user $U_a$ with help of compass determines the angle under which he is going to move in order to bypass the obstacle. The user $U_a$ moves along relatively straight lines and, prior to any direction changes, The user $U_a$ inputs via an input such as a button to the monitoring unit an angle as to the direction the user is going to be moving (relative to the "North" axis) so as to enable the monitoring unit to compute or keep track of the user's $U_a$ coordinates.

2. All users $U_a$, $U_b$, and or $U_c$ are mobile. The following steps can be taken with respect to user $U_a$, but also similar steps may be taken by users $U_b$ and or $U_c$ using their units, for accurate determination of the unit's coordinates for $U_a$. Once user $U_a$ has moved a certain distance, for example, after every 1-meter of operator movement, a determination is made of the user's $U_a$ height (the third coordinate) and the bearing (angle) of movement relatively to the "North" axis. Corresponding updates are made to the user's $U_a$ coordinates in order to take into account the landscape profile. In case of an obstacle the user $U_a$ switches the monitoring or master unit to manual control. The user $U_a$ With help of compass determines the angle under which he is going to move in order to bypass the obstacle. The user $U_a$ moves along relatively straight lines and, prior to any direction changes, The user $U_a$ inputs via an input such as a button to the monitoring unit an angle as to the direction the user is going to be moving (relative to the "North" axis) so as to enable the monitoring unit to compute or keep track of the user's $U_a$ coordinates.

3. The compass incorporated in the user's $U_a$ monitoring or master unit can determine the "North" direction. The user $U_a$ can determine a reference of to North from the unit or a display of North on the unit. As a result, the user $U_a$ can be given instructions and display of all directions of movement (bearing) relative to the "North" direction. For example, a command given to user $U_a$ of "45 degrees North-East" instructs the user $U_a$ facing North to go at a 45 degree angle to the right.

4. When numerous users $U_a$, $U_b$, ... $U_N$ are searching for M targets $T_a$, $T_b$ ... $T_M$, where (M<N), a similar search method can be used as described herein, whereby the monitoring or master unit of user $U_a$ transmits a target ID to adjacent master units of $U_b$, ... $U_N$. In return the master unit of user $U_a$ receives the distances to the target T and coordinates of adjacent master units of $U_b$, ... $U_N$ that responded with the distance measurements. Based on this information (target ID, distance and coordinates) and the coordinates of the searching the master unit of user $U_a$ computes the position of target T.

5. The searching method when numerous users $U_a$, $U_b$, ... $U_N$ are searching for M targets $T_a$, $T_b$, ... $T_M$ can utilize RF multi-channel technology to efficiently utilize the bandwidth such as, for example, time division, frequency division, etc. To further enhance the capabilities of the monitoring or master units as well as the slave units disposed on the target(s) T, whereby the units utilize different channels and time division within the same channels to communicate with different units in real time.

EXAMPLE (2)

Three Dimensional Finding

Stationary and Mobile Operators

If users each or any of numerous users $U_a$, $U_b$, $U_c$, $U_d$ ... $U_N$ are searching for multiple M targets $T_a$, $T_b$, ... $T_M$; three dimensional finding can occur utilizing four stationary users $U_a$, $U_b$, $U_c$ and $U_d$, whereby it is possible to determine all three coordinates for every other user $U_e$, ... $U_N$ that is mobile including a user system $U_M$ disposed on the target T. In this example, each user $U_a$, $U_b$, $U_c$ and $U_d$ searching and or tracking a target $T_M$ or other multiple targets $T_a$, $T_b$, ... $T_M$ do not need to utilize the pedometer and or altimeter; however, they will still require use of an integrated compass or other device or method that can provide equivalent information. Moreover, if users $U_a$, $U_b$, $U_c$ and $U_d$ searching and or tracking target $T_M$ are stationary, for every other users $U_e$ ... $U_N$ searching and or tracking target $T_M$, the unit of the fifth user $U_e$ or others $U_N$ do not need to measure the traveled distance and height because the coordinates of the fifth or any other user $U_e$ can be determined from the distance measurements and coordinates of stationary master units of each users $U_a$, $U_b$, $U_c$ and $U_d$.

An exemplary method of the user utilizing the master and slave units when users $U_a$, $U_b$, $U_c$, ... $U_N$ are searching for M targets $T_a$, $T_b$, ... $T_M$ and four users $U_a$, $U_b$, $U_c$ and $U_d$ are stationary, then it is possible to determine all three coordinates for every other mobile user $U_e$, ... $U_N$ is as follows:

1. Establishing a system of coordinates on a natural plain that is referenced to four parts of the world (North-South, East-West).
2. At least one active master or monitoring unit of a user $U_a$, $U_b$, $U_c$, ... $U_N$ has a compass either configured to generate directional information with reference to the coordinate plane, i.e. North.
3. Obtain origin coordinates of stationary or known determined from the distance measurements and coordinates of stationary master units of each users $U_a$, $U_b$, $U_c$ and $U_d$ in the natural coordinate system.
4. Each user $U_a$, $U_b$, $U_c$ and $U_d$ of stationary master units are not disposed along one straight line and/or in the plane such that different coordinate points can be obtained for each user $U_a$, $U_b$, $U_c$ and $U_d$ of stationary master units The process of a search consists of the establishing the following steps:

1. Monitoring unit (device 5) of user $U_e$ periodically measures a distance $R_5$ to target T. If the distance $R_5$ to target T exceeds a predetermined threshold "D", monitoring unit notifies user $U_e$ of this condition.
2. Beginning of a search. Monitoring unit of user $U_e$ is enabled in a search/track mode and the Monitoring unit of user $U_e$ can transmit the RF id or other identification number (code) of the target T to be searched for and/or tracked, to four users $U_a$, $U_b$, $U_c$ and $U_d$ of the stationary monitoring units (devices 1, 2, 3 and 4).
3. Stationary monitoring units (devices 1, 2, 3 and 4) of users $U_a$, $U_b$, $U_c$, and $U_d$ determine respective distances $R_1$, $R_2$, $R_3$ and $R_4$ to target T, and send these distances and the coordinates of $U_a$, $U_b$, $U_c$ and $U_d$ to monitoring unit (device 5) of user $U_e$.
4. Stationary monitoring units (devices 1, 2, 3 and 4) of users $U_a$, $U_b$, $U_c$ and $U_d$ determine the distances to the searching/tracking to monitoring unit (device 5) of user $U_e$ ($R_{1-Ua}$ (Ro1), $R_{2-Ub}$ (Ro2), $R_{3-Uc}$ (Ro3), and $R_{4-Ud}$ (Ro4)). The values of $R_{Ua1}$, $R_{Ub2}$, $R_{Uc3}$ and $R_{Ud4}$ are transmitted or otherwise sent to monitoring unit (device 5) of user $U_e$.
5. Based on the transmitted supplied information of values the monitoring unit (device 5) user $U_e$ calculates coordinates ($X_{15}$, $X_{25}$, $X_{35}$) of user $U_e$ and coordinates ($X_{11}$, $X_{21}$, $X_{31}$), ($X_{12}$, $X_{22}$, $X_{32}$), ($X_{13}$, $X_{23}$, $X_{33}$), ($X_{14}$, $X_{24}$, $X_{34}$) respectively of stationary monitoring units (devices 1, 2, 3 and 4) of users $U_a$, $U_b$, $U_c$ and $U_d$.
6. Device 5 (the monitoring unit of user $U_e$) calculates and or otherwise determines coordinates ($x_1$, $x_2$, $x_3$) of target T based on the supplied data $R_{1-Ua}$, $R_{2-Ub}$, $R_{3-Uc}$ and $R_{4-Ud}$ and coordinates ($X_{11}$, $X_{21}$, $X_{31}$), ($X_{12}$, $X_{22}$, $X_{32}$), ($X_{13}$, $X_{23}$, $X_{33}$), ($X_{14}$, $X_{24}$, $X_{34}$) of users $U_a$, $U_b$, $U_c$ and $U_d$.
7. Using coordinates ($x_1$, $x_2$, $x_3$) of target T and known coordinates ($x_1$, $x_2$, $x_3$) of monitoring unit (device 5) of user $U_e$, the device 5 calculates an angle of motion of device 5 of user $U_e$ toward the target T.
8. Device 5 displays compass information with an indication of suggested direction of motion of user $U_e$. Device 5 can display an image of coordinate grid with the location of users $U_a$, $U_b$, $U_c$, ... $U_N$ and target T, for example, user $U_e$ and users $U_a$, $U_b$, $U_c$ and $U_d$ relative to target T.
9. Device 5 and user $U_e$ begin to travel in the indicated direction.
10. Periodically, for example every 15 seconds (or every 10 meters), device 5 of user $U_e$ repeats steps 1-10 so as to provide to device 5 of user $U_e$ correction of direction of motion information on the device 5. Advantageously, during the repeating of steps 1-10 device 5 of user $U_e$ requests updates from of stationary monitoring units (devices 1, 2, 3 and 4) of users $U_a$, $U_b$, $U_c$ and $U_d$ so that new signals are transmitted to device 5 and device 5 (the monitoring unit of user $U_e$) calculates and or otherwise determines coordinates ($x_1$, $x_2$, $x_3$) of target T.
11. Steps 1-10 are repeated until the monitoring unit of user $U_e$ finds target T.

The following defined terms are used throughout the process description:
R(i)—distance d of i-th operator to target T;
d—distance traveled (by a particular mobile user)
$x_1$—first coordinate target T
$x_2$—second coordinate target T
$x_3$—third coordinate target T
$X_1$(i)—first coordinate operator i $X_2(i)$—second coordinate operator i
$X_3(i)$—third coordinate operator i
DA—Device action
P(i)—i-th standard computational procedure
RF ID code—target T identification code.

To determine the coordinates by calculating Procedure 1 of the target T; from sphere equations can calculate the position as follows:

$$(x_1-X_{11})^2+(x_2-X_{21})^2+(x_3-X_{31})^2=R_1^2 \quad (1)$$

$$(x_1-X_{12})^2+(x_2-X_{22})^2+(x_3-X_{32})^2=R_2^2 \quad (2)$$

$$(x_1-X_{13})^2+(x_2-X_{23})^2+(x_3-X_{33})^2=R_3^2 \quad (3)$$

$$(x_1-X_{14})^2+(x_2-X_{24})^2+(x_3-X_{34})^2=R_4^2 \quad (4)$$

By removing the parentheses and subtracting equation (2) from equation (1) we can express $x_2$ through $x_1$ and $x_3$. By removing the parentheses and subtracting equation (3) from equation (2) we can express $x_3$ through $x_1$ when the obtained results of $x_2$ are substituted as $x_1$. Further substitution in equation (1) of the obtained result of $x_3$, we can obtain the dependency of $x_2$ from $x_1$. Further substitution in equation (1) of the obtained result of $x_3$ and the obtained results of $x_2$ we can obtain $x_1$. Finally we can obtain $x_2$ and $x_3$ by substituting the obtained results of values $x_1$ into $x_2$ from $x_1$ dependency and $x_3$ from $x_1$ dependency. As a result of the substitutions and computations, eight points are obtained so as to be used for consecutive substitutions in equation (4).

The set of coordinates for equation (4) that converts equation (4) into the equality that will produce the desired points, as follows:

$$(x_1=T, x_2=(TN+O)/KF, x_3=(L-MT)/K)$$

$$(x_1=T, x_2=(UN+O)/KF, x_3=(L-MT)/K)$$

$$(x_1=T, x_2=(UN+O)/KF, x_3=(L-MU)/K)$$

$$(x_1=T, x_2=(TN+O)/KF, x_3=(L-MU)/K)$$

$$(x_1=U, x_2=(TN+O)/KF, x_3=(L-MU)/K)$$

$$(x_1=U, x_2=(UN+O)/KF, x_3=(L-MT)/K)$$

$$(x_1=U, x_2=(TN+O)/KF, x_3=(L-MT)/K)$$

$$(x_1=U, x_2=(UN+O)/KF, x_3=(L-MU)/K)$$

where:

$$T=(-R+\sqrt{R^2-4QS})/2Q$$

$$U=(-R-\sqrt{R^2-4QS})/2Q$$

$$Q=((KF)^2+N^2+(FM)^2)$$

$$R=((-2(X_{11})(RF)^2+2NO-2KF(X_{21})N-2(F^2)ML+2X_{(31)}(F^2)KM$$

$$S=(O^2-2X_{(21)}KFO+(FL)2-2X_{(31)}L(F^2)K+P$$

$$P=((X_{11})^2+(X_{21})^2+(X_{31})^2-R_1^2$$

$$Q=((KF)^2+N^2+(FM)^2)$$

$$O=(KC-EL)$$

$$N=(EM-KD)$$

$$M=(HF-ID)$$

$$K=(JF-IE)$$

$$L=(FK-IC-FG)$$

$$K=R_2-R_3^2$$

$$J=2(X_{33}-X_{32})$$

$$I=2(X_{23}-X_{22})$$

$$H=2(X_{13}-X_{12})$$

$$F=2(X_{22}-X_{21})$$

$$E=2(X_{32}-X_{31})$$

$$D=2(X_{12}-X_{11})$$

$$G=((X_{12})^2+(X_{22})^2+(X_{32})^2-(X_{13})^2-(X_{23})^2-(X_{33})^2)$$

$$C=B-A$$

$$B=R_1^2-R_2^2$$

$$A=((X_{11})^2+(X_{21})^2+(X_{31})^2-(X_{12})^2-(X_{12})^2-(X_{32})^2)$$

Similarly, To determine the coordinates by calculating Procedure 1 of the target T; from sphere equations can calculate the position as follows:

$$(X_{15}-X_{11})^2+(X_{25}-X_{21})^2+(X_{35}-X_{31})^2=(R_{1-Ua})^2 \quad (5)$$

$$(X_{15}-X_{12})^2+(X_{25}-X_{22})^2+(X_{35}-X_{23})^2=(R_{2-Ub})^2 \quad (6)$$

$$(X_{15}-X_{13})^2+(X_{25}-X_{23})^2+(X_{35}-X_{33})^2=(R_{3-Uc})^2 \quad (7)$$

$$(X_{15}-X_{14})^2+(X_{25}-X_{24})^2+(X_{35}-X_{34})^2=(R_{4-Ud})^2 \quad (8)$$

By removing the parenthesis and subtracting equation (6) from equation (5) we can express $X_{25}$ through $X_{15}$ and $X_{35}$. By removing the parenthesis and subtracting equation (7) from equation (6) we can express $X_{35}$ through $X_{15}$ when the obtained results of $X_{25}$ are substituted through $X_{15}$ and $X_{35}$. Further substitution in equation (5) of the obtained result of $X_{35}$, we can obtain the dependency of $X_{25}$ from $X_{15}$. Further substitution in equation (5) of the obtained result of $X_{35}$ and the obtained results of $X_{25}$ we can obtain $X_{15}$. Finally we can obtain $X_{25}$ and $X_{35}$ by substituting the obtained results of values $X_{15}$ into $X_{25}$ from $X_{15}$ dependency and $X_{35}$ from $X_{15}$ dependency. As a result of the substitutions and computations, eight points are obtained so as to be used for consecutive substitutions in equation (8).

The set of coordinates for equation (8) turns the equation (8) into equality that converts the desired points of the coordinates of user $U_e$ of device 5, as follows:

$$(X_{15}=T, X_{25}=(TN+O)/KF, X_{35}=(L-MT)/K)$$

$$(X_{15}=T, X_{25}=(UN+O)/KF, X_{35}=(L-MT)/K)$$

$$(X_{15}=T, X_{25}=(UN+O)/KF, X_{35}=(L-MU)/K)$$

$$(X_{15}=T, X_{25}=(TN+O)/KF, X_{35}=(L-MU)/K)$$

$$(X_{15}=U, X_{25}=(TN+O)/KF, X_{35}=(L-MU)/K)$$

$$(X_{15}=U, X_{25}=(UN+O)/KF, X_{35}=(L-MT)/K)$$

$$(X_{15}=U, X_{25}=(TN+O)/KF, X_{35}=(L-MT)/K)$$

$$(X_{15}=U, X_{25}=(UN+O)/KF, X_{35}=(L-MU)/K)$$

where:

$T = (-R + \sqrt{R^2 - 4QS})/2Q$ $U = (-R - \sqrt{R^2 - 4QS})/2Q$ $Q = ((KF)^2 + N^2 + (FM)^2)$ $R = ((-2(X_{11})(RF)^2 + 2NO - 2KF(X_{21})N - 2(F^2)ML + 2X_{(31)}(F^2)KM$ $S = (O^2 - 2X_{(21)}KFO + (FL)2 - 2X_{(31)}L(F^2)K + P$ $P = ((X_{11})^2 + (X_{21})^2 + (X_{31})^2 - R_1^2$ $Q = ((KF)^2 + N^2 + (FM)^2)$ $O = (KC - EL)$ $N = (EM - KD)$ $M = (HF - ID)$ $K = (JF - IE)$ $L = (FK - IC - FG)$ $K = Ro2^2 - Ro3^2$ $J = 2(X_{33} - X_{32})$ $I = 2(X_{23} - X_{22})$ $H = 2(X_{13} - X_{12})$ $F = 2(X_{22} - X_{21})$ $E = 2(X_{32} - X_{31})$ $D = 2(X_{12} - X_{11})$ $G = ((X_{12})^2 + (X_{22})^2 + (X_{32})^2 - (X_{13})^2 - (X_{23})^2 - (X_{33})^2)$ $C = B - A$ $B = Ro1^2 - Ro2^2$ $A = ((X_{11})^2 + (X_{21})^2 + (X_{31})^2 - (X_{12})^2 - (X_{12})^2 - (X_{32})^2)$ An exemplary method of finding a direction of motion or angle A toward the target T when users $U_a$, $U_b$, $U_c$, ... $U_N$ are searching for M targets $T_a$, $T_b$, ... $T_M$ utilizing the master and slave units. Simply, the method and system of the present invention can determine a direction of motion of user $U_e$ of device 5 toward the target T. For Procedure 3: calculation of direction of motion or angle A of device 5 used by user $U_e$ in motion toward target T can be determined relative to the natural coordinates system "North" axis. Angle A is calculated based on the mobile user $U_e$ (device 5) and target T coordinates as follows:

$\cos(A) = (x_2 - X_{2(5)})/R_5$ (9)

therefore, $A = \arccos((x_2 - X_{2(5)})/R_5)$ (10)

A direction of motion of user $U_e$ of device 5 can be calculated by using the following steps:

1. If Angle A>90 & $x_1 < X1_{(5)}$ then device 5 instructs and or displays "(180-A) degrees in South-West" direction to user $U_e$.
2. If Angle A>90 & $x_1 > X_{1(5)}$ then device 5 instructs and or displays "(180-A) degrees in South-East" direction to user $U_e$.
3. If Angle A<90 & $x_1 < X_{1(5)}$ then device 5 instructs and or displays "A degrees in North-West" direction to user $U_e$.
4. If Angle A<90 & $x_1 > X_{1(5)}$ then device 5 instructs and or displays "A degrees in North-East" direction to user $U_e$.

An exemplary method to search or track the direction of motion of device 5 of user $U_e$ using the system of the present invention, is further defined as comprising:

1. If the distance $R_5$ to target T exceeds a predetermined threshold "D", $R_5 > D$, then monitoring unit notifies user $U_e$ of this condition by displaying <<Search mode>> else <<Monitoring mode>> (where D—distance threshold).
2. Otherwise, the monitoring unit notifies user $U_e$ that <<Search mode>> is ON.
3. Device action DA: Device 5 of user $U_e$ sends the target ID code to four stationary monitoring units (devices 1, 2, 3 and 4) to four stationary users $U_a$, $U_b$, $U_c$ and $U_d$, respectively
4. Device action DA: Devices 1, 2, 3 and 4 of the four stationary users $U_a$, $U_b$, $U_c$ and $U_d$, respectively, receive the target ID code and:
   a. Perform a distance measurement to target that was identified in (3);
   b. Send back to device 5 of user $U_e$ the measured distance $R_{(i)}$ values (where i is 1-4) of devices 1, 2, 3 and 4 of the four stationary users $U_a$, $U_b$, $U_c$ and $U_d$ to the target T, and coordinate values ($X_{11}$, $X_{21}$, $X_{31}$), ($X_{12}$, $X_{22}$, $X_{32}$), ($X_{13}$, $X_{23}$, $X_{33}$), ($X_{14}$, $X_{24}$, $X_{34}$).
   c. Send back to Device 5 of user $U_e$ measured distances $R_{o(i)}$ values, where i is the identity code of devices 1-4.
5. Device action DA: Device 5 of user $U_e$ sends the target ID code:
   a. Based on the above information, using $P_1$ the device calculates its own coordinate values ($X_{15}$, $X_{25}$, $X_{35}$).
   b. Based on the above information, using $P_2$ the device calculates the target coordinates: ($X_{15}$, $X_{25}$, $X_{35}$).
   c. Based on ($X_{15}$, $X_{25}$, $X_{35}$), ($x_1$, $x_2$, $x_3$) values using $P_3$ the device determines angle A value and the direction of motion toward the target relatively to the "North" axis.
6. Device 5 of user $U_e$ stores angle A value and direction of motion toward target T.
7. Device 5 of displays prompts user $U_e$ with a suggested motion direction toward the target.
8. User $U_e$ moves with device 5 according to the recommended direction, for example, for 15 seconds or other update interval.
9. Device action DA: Device 5 prompts user $U_e$ to stop or other update interval while he remains in motion.
10. Device action DA: Device 5 repeats paragraph 3-10 until target is found.

EXAMPLE (3)

Three Dimensional Mobile Finding i. All Mobile Operators

According to yet another exemplary example of the method of the present invention, if all four users $U_a$, $U_b$, $U_c$ and $U_d$ are mobile and the fifth mobile user $U_e$ is searching and/or tracking the target T, then all four devices 1, 2, 3 and 4 disposed on users $U_a$, $U_b$, $U_c$ and $U_d$, respectively, are configured with a pedometer, altimeter and compass or, alternatively, some other device or method for providing such comparable information. Device 5 of the fifth mobile user $U_e$ is configured with a compass; as it is not necessary that device 5 be equipped with a pedometer and/or altimeter and the method can be implemented without them. According to the method of finding of the present invention, the methods embodied in the Second Example of Three Dimensional Mobile Finding Stationary and Mobile Operator can be utilized to provide device 5 of the fifth mobile user $U_e$ with a direction toward the target T when performing a searching and/or tracking process according to the present invention.

According to still yet another exemplary example of the method of the present invention, if all four users $U_a$, $U_b$, $U_c$ and $U_d$ are mobile and the fifth mobile user $U_e$ is searching and/or tracking the target T, then all four devices 1, 2, 3 and 4 disposed on users $U_a$, $U_b$, $U_c$ and $U_d$, respectively, are configured with a compass but not a pedometer and/or altimeter. Again, device 5 of the fifth mobile user $U_e$ is configured with a compass; as it is not necessary that device 5 be equipped with a pedometer and/or altimeter. According to the method of finding of the present invention, the methods embodied in the Second Example of Three Dimensional Mobile Finding Stationary and Mobile Operator can be utilized to provide device 5 of the fifth mobile user $U_e$ with a direction toward the target T when performing a searching and/or tracking process; however, the performance of the finding is diminished as the condition must exist where one of users is moving the other users must remain stationary. For example, if only a compass is disposed on the devices 1, 2, 3 and 4, then only user $U_a$ is mobile, then users $U_b$, $U_c$ and $U_d$ must be stationary while the fifth mobile user $U_e$ is searching and/or tracking the target T.

According to a further exemplary example of the method of the present invention where all four users $U_a$, $U_b$, $U_c$ and $U_d$ are mobile and searching and or tracking a target T inside a building, then all four devices 1, 2, 3 and 4 disposed on users $U_a$, $U_b$, $U_c$ and $U_d$, respectively, are configured with a pedometer and altimeter; however, a compass is optional. According to the process of the present invention, at least four devices 1, 2, 3 and 4 disposed on users $U_a$, $U_b$, $U_c$ and $U_d$, respectively, and configured with a pedometer and altimeter are necessary to accomplish the finding. According to the method of finding of the present invention, the exemplary method embodied in the Example (2) for Three Dimensional Mobile Finding Stationary and Mobile Operator can be utilized, for example, information is provided to and from device 4 of the fourth mobile user $U_d$ with a direction toward the target T when performing a searching and/or tracking process.

Essentially, the process of the present invention is configured to search and/or track the target T without the need for creating stationary devices 1, 2, 3 and 4 disposed on users $U_a$, $U_b$, $U_c$ and $U_d$. For example, four devices 1, 2, 3 and 4 disposed on users $U_a$, $U_b$, $U_c$ and $U_d$ can search numerous targets T as well as for tracking each of the devices 1, 2, 3 and 4 disposed on users $U_a$, $U_b$, $U_c$ and $U_d$ as targets T in the building, harsh environment or uneven terrain. The process utilizes the input of a compass and pedometer as well as the knowledge of the origin coordinates of each of the devices 1, 2, 3 and 4 disposed on users $U_a$, $U_b$, $U_c$ and $U_d$ so as to determine and calculate the coordinates of each of the devices 1, 2, 3 and 4. As a result, it is not necessary to hold the each of the devices 1, 2, 3 and 4 fixed or stationary. The process further relies on a third coordinate value of the operators in each of the devices 1, 2, 3 and 4 disposed on users $U_a$, $U_b$, $U_c$ and $U_d$. This can be done by the use of altimeters, measurements of height of floors within buildings or other sources that provide information that can provide the height of the users.

The process of a search consists of the establishing the following steps:

1. Each of the mobile devices 1, 2, 3 and 4 disposed on users $U_a$, $U_b$, $U_c$ and $U_d$ are employed and configured to search and/or track a target T in the building. Each of the mobile devices 1, 2, 3 and 4 disposed on users $U_a$, $U_b$, $U_c$ and $U_d$ are configured with a compass and pedometers. Again use of altimeters is optional.
2. Each of the mobile devices 1, 2, 3 and 4 disposed on users $U_a$, $U_b$, $U_c$ and $U_d$ establishes a system of coordinates in a plane that is referenced to a coordinate system, for example, four parts of the world (North-South, East-West).
3. The process takes into account a value for distance between floors (floor height) that is known, measured initially or otherwise estimated. Each of the mobile devices 1, 2, 3 and 4 disposed on users $U_a$, $U_b$, $U_c$ and $U_d$ is configured to correlate the height value with the floor number and vise versa.
4. Each of the mobile devices 1, 2, 3 and 4 disposed on users $U_a$, $U_b$, $U_c$ and $U_d$ exchange origin coordinates of all users $U_a$, $U_b$, $U_c$ and $U_d$ in the a natural coordinate system such that these are known.
5. Each of the mobile devices 1, 2, 3 and 4 disposed on users $U_a$, $U_b$, $U_c$ and $U_d$ is configured to determine and/or calculate a distance traveled by the operator as well as the operator's direction of motion relatively to one of the axis of the natural system of coordinates, for example "North" axis.
6. In an optional step, each of the mobile devices 1, 2, 3 and 4 disposed on users $U_a$, $U_b$, $U_c$ and $U_d$ is configured to ignore or not account for distance measurement errors in order to speed accuracy.
7. In yet another optional step, it is assumed that device 4 of user $U_d$ is the monitoring and or master unit performing the searching/tracking of the target T. A default value can be established by the process that device 4 of user $U_d$ resides on the floor that is closest to the target's T floor.
8. All of the mobile devices 1, 2, 3 and 4 disposed on users $U_a$, $U_b$, $U_c$ and $U_d$ operators are configured to display and/or transmit a value corresponding to a floor upon which they reside.

The following defined terms are used throughout the process description:

R(i)—distance of i-th operator to target
d—distance traveled (by a particular mobile user);
$x_1$—first coordinate target T
$x_2$—second coordinate target T
$x_3$—third coordinate target T
$X_1(i)$—first coordinate operator i
$X_2(i)$—second coordinate operator i
$X_3(i)$—third coordinate operator i
DA—Device action
P(i)—i-th standard computational procedure
RF ID code—target T identification code.

To determine the coordinates by calculating Procedure 1 of the target T; from sphere equations can calculate the position as follows:

$$(x_1-X_{11})^2+(x_2-X_{21})^2+(x_3-X_{31})^2=R_1^2 \quad (1)$$

$$(x_1-X_{12})^2+(x_2-X_{22})^2+(x_3-X_{32})^2=R_2^2 \quad (2)$$

$$(x_1-X_{13})^2+(x_2-X_{23})^2+(x_3-X_{33})^2=R_3^2 \quad (3)$$

$$(x_1-X_{14})^2+(x_2-X_{24})^2+(x_3-X_{34})^2=R_4^2 \quad (4)$$

By removing the parentheses and subtracting equation (2) from equation (1) we can express $x_2$ through $x_1$ and $x_3$. By removing the parentheses and subtracting equation (3) from equation (2) we can express $x_3$ through $x_1$ when the obtained results of $x_2$ are substituted as $x_1$. Further substitution in equation (1) of the obtained result of $x_3$, we can obtain the dependency of $x_2$ from $x_1$. Further substitution in equation (1) of the obtained result of $x_3$ and the obtained results of $x_2$ we can obtain $x_1$. Finally we can obtain $x_2$ and $x_3$ by substituting the obtained results of values $x_1$ into $x_2$ from $x_1$ dependency and $x_3$ from $x_1$ dependency. As a result of the substitutions and computations, eight points are obtained so as to be used for consecutive substitutions in equation (4).

The set of coordinates for equation (4) converts to the desired points, as follows:

$$(x_1=T, x_2=(TN+O)/KF, x_3=(L-MT)/K)$$

$$(x_1=T, x_2=(UN+O)/KF, x_3=(L-MT)/K)$$

$$(x_1=T, x_2=(UN+O)/KF, x_3=(L-MU)/K)$$

$$(x_1=T, x_2=(TN+O)/KF, x_3=(L-MU)/K)$$

$$(x_1=U, x_2=(TN+O)/KF, x_3=(L-MU)/K)$$

$$(x_1=U, x_2=(UN+O)/KF, x_3=(L-MT)/K)$$

$$(x_1=U, x_2=(TN+O)/KF, x_3=(L-MT)/K)$$

$$(x_1=U, x_2=(UN+O)/KF, x_3=(L-MU)/K)$$

where:

$$T=(-R+\mathrm{sqrt}(R^2-4QS))/2Q$$

$$U=(-R-\mathrm{sqrt}(R^2-4QS))/2Q$$

$$Q=((KF)^2+N^2+(FM)^2)$$

$$R=((-2(X_{11})(RF)^2+2NO-2KF(X_{21})N-2(F^2)ML+2X_{(31)}(F^2)KM$$

$$S=(O^2-2X_{(21)}KFO+(FL)2-2X_{(31)}L(F^2)K+P$$

$$P=((X_{11})^2+(X_{21})^2+(X_{31})^2-R_1^2$$

$$Q=((KF)^2+N^2+(FM)^2)$$

$$O=(KC-EL)$$

$$N=(EM-KD)$$

$$M=(HF-ID)$$

$$K=(JF-IE)$$

$$L=(FK-IC-FG)$$

$$K=R_2^2-R_3^2$$

$$J=2(X_{33}-X_{32})$$

$$I=2(X_{23}-X_{22})$$

$$H=2(X_{13}-X_{12})$$

$$F=2(X_{22}-X_{21})$$

$$E=2(X_{32}-X_{31})$$

$$D=2(X_{12}-X_{11})$$

$$G=((X_{12})^2+(X_{22})^2+(X_{32})^2-(X_{13})^2-(X_{23})^2-(X_{33})^2)$$

$$C=B-A$$

$$B=R_1^2-R_2^2$$

$$A=((X_{11})^2+(X_{21})^2+(X_{31})^2-(X_{12})^2-(X_{12})^2-(X_{32})^2)$$

Calculation of direction of motion or angle A of operator of device used by user $U_d$ in motion toward target T can be determined relative to the natural coordinates system "North" axis. Angle A is calculated based on the mobile user $U_d$ device 4 and target T coordinates as follows:

$$\cos(A)=(x_2-X_{2(4)})/R_4 \qquad (9)$$

therefore, $$A=\arccos((x_2-X_{2(4)})/R_4) \qquad (10)$$

ii. Spherical Virtual Triangulation

In order to determine the coordinate position $P_1$ and position $P_2$ of the target T, sphere equations can calculate the position according to the discussion herein with reference to equations (1) through (8) so as to obtain a set of eight coordinates for equation (8).

Figure 4:
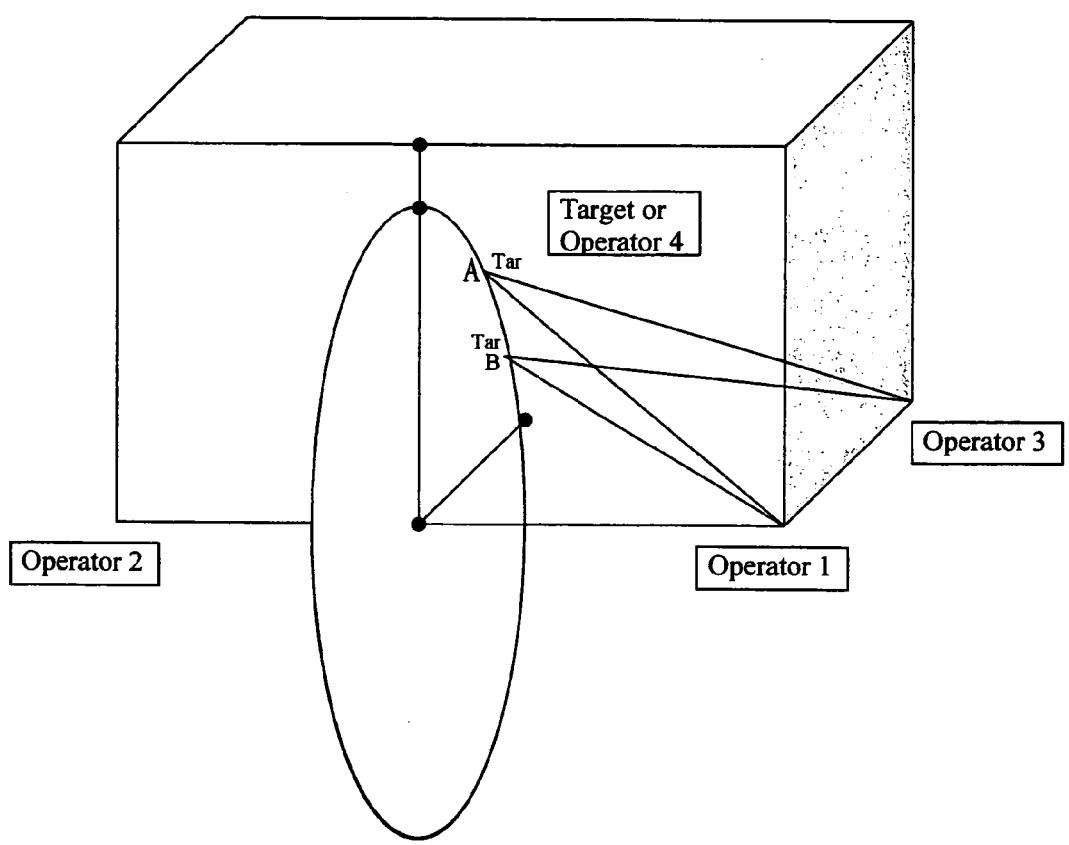
FIG. 4 is a schematic diagram illustrating RF mobile tracking and locating system to determine the position of the units using spherical coordinates.

Referring to FIG. 4, the present invention can utilize a method and process utilizing points on a sphere. For example, three spheres can be established with the centers that do not lie on a straight line using devices 1, 2 and 3 disposed on users $U_a$, $U_b$ and $U_c$. As a result, the number of useful points are found at the intersection of such intersecting spheres, for example, the intersecting points of equal either to zero, one, or two. Moreover, if the number of points is equal to two, then any such two points are located on the different sides of plane passing through the centers of spheres.

Under certain conditions, the process of the present invention determines the floor of the target T and the fourth operator unambiguously. For example, we locate three stationary devices 1, 2 and 3 disposed on users $U_a$, $U_b$ and $U_c$ are located in the corners of the building and apply the constraints of procedure $P_1$, either coordinates of target T or coordinates of device 4 disposed on user $U_d$ can be found for the spheres equations in $P_1$.

Three spheres with the centers, which do not lie on one straight, have a number of points. The points lie at the intersection of these spheres and are equal either to zero, one, or two. If the number of points is equal to two, then both points are located on the different sides of plane passing through the centers of spheres. Therefore optimal results can be obtained by arranging three devices, for example, devices 1, 2 and 3 disposed on the users $U_a$, $U_b$ and $U_c$, along the angles of the building, whereby the entire building is located inside the parallelepiped formed by the users $U_a$, $U_b$ and $U_c$.

A method of using sphere equations formed by devices 1, 2 and 3 disposed on the users $U_a$, $U_b$ and $U_c$ according to the present invention is disclosed. Spheres can be formed from the signals of device 1 disposed on user $U_a$ that has a distance of $R_1$. Another sphere can be formed around device 2 disposed on user $U_b$ that has a distance of $R_2$. Referring to FIG. 4, a circle is formed at the intersection of spheres formed around devices 1 and 2 having a center on the axis that connecting users $U_a$ and $U_b$ and the circle is perpendicular to this axis. The distances $R_1$, $R_2$, $R_3$ from to the target T from devices 1, 2 and 3 disposed on users $U_a$, $U_b$ and $U_c$ locate the target $T_{ar}$ is located on this circle. Moreover, the sphere with a radius of $R_3$ around user $U_c$ intersects the circle only at one point.

Similarly, a direction of motion of user $U_d$ of device 4 can be calculated by using the following steps:
1. If Angle A>90 & $x_1<X_{1(4)}$ then device 4 instructs and or displays "(180-A) degrees in South-West" direction to user $U_d$.
2. If Angle A>90 & $x_1>X_{1(4)}$ then device 4 instructs and or displays "(180-A) degrees in South-East" direction to user $U_d$.
3. If Angle A<90 & $x_1<X_{1(4)}$ then device 4 instructs and or displays "A degrees in North-West" direction to user $U_d$.
4. If Angle A<90 & $x_1>X_{1(4)}$ then device 4 instructs and or displays "[A] degrees in North-East" direction to user $U_d$.

In order to determine the coordinate position $P_3$ of the target T, sphere equations can calculate the position according to the discussion herein with reference to appropriate equations (1)-(10) above Coordinates calculations according to equations (11), (12), (13) and (14) can be used to update the coordinates. For example, four coordinate pairs are possible according to equations (11), (12), (13) and (14) according to the number of possible directions of movement, for example, if Angle A>90 & $x_1>X_{1(4)}$; Angle A>90 & $x_1>X_{1(4)}$; Angle A<90 & $x_1>X_{1(4)}$; and Angle A<90 & $x_1>X_{1(4)}$ as set forth above. Accordingly, for every possible direction of movement enumerated above, coordinates calculations according to equations (11), (12), (13) and (14) can be used to determine the coordinates of mobile devices 1, 2, 3 and 4 disposed on users $U_a$, $U_b$, $U_c$ and $U_d$ after the passage of distance d in the suggested direction displayed on the devices 1-4.

$$X_{1(i)}\text{new}=X_{1(i)}-\sin(A)*d, X_{2(i)}\text{new}=X_{2(i)}-\cos(A)*d \quad (11)$$

$$X_{1(i)}\text{new}=X_{1(i)}+\sin(A)*d, X_{2(i)}\text{new}=X_{2(i)}-\cos(A)*d \quad (12)$$

$$X_{1(i)}\text{new}=X_{1(i)}-\sin(A)*d, X_{2(i)}\text{new}=X_{2(i)}+\cos(A)*d \quad (13)$$

$$X_{1(i)}\text{new}=X_{1(i)}+\sin(A)*d, X_{2(i)}\text{new}=X_{2(i)}+\cos(A)*d \quad (14)$$

The process of a search consists of the establishing the following steps:
1. If the distance $R_4$ to target T exceeds a predetermined threshold "D", $R_4>D$, then monitoring unit notifies user $U_d$ of this condition by displaying <<Search mode>> else <<Monitoring mode>> (where D—distance threshold).
2. Otherwise, the monitoring unit notifies user $U_d$ that <<Search mode>> is ON.
3. Device action DA: Device 4 stores the target ID code to itself (device 4 of user $U_d$) and sends the target ID code to three stationary monitoring units devices 1, 2, and 3 of users $U_a$, $U_b$ and $U_c$, respectively.
4. DA of Devices 1, 2, and 3 of users $U_a$, $U_b$ and $U_c$:
   a) Device action DA: Devices perform a distance measurement to target T identified by device 4 of user $U_d$ in step (3) so as to determine distances to the target $R_1$, $R_2$, and $R_3$.
   b) Device action DA: Devices 1, 2, and 3 of users $U_a$, $U_b$ and $U_c$ transmit or otherwise send back to device 4 of user $U_d$ measured distances to the target $R_1$, $R_2$, and $R_3$, which can be represented as distance R(i) values, where i is 1-3 having coordinates values $(X_{11}, X_{21}, X_{31})$, $(X_{12}, X_{22}, X_{32})$, $(X_{13}, X_{23}, X_{33})$.
5. Device action DA: Device 4 calculates the target coordinates: $(x_1, x_2, x_3)$ using $P_1$ and location of Target T.
   a) Using $P_1$ the device 4 calculates the target coordinates: $(x_1, x_2, x_3)$, which is based on the above information: $R_1$, $R_2$, $R_3$ and $R_4$ the coordinates of mobile devices 1, 2, 3 and 4 disposed on users $U_a$, $U_b$, $U_c$ and $U_d$ $(X_{11}, X_{21}, X_{31})$, $(X_{12}, X_{22}, X_{32})$, $(X_{13}, X_{23}, X_{33})$ $(X_{14}, X_{24}, X_{34})$.
   b) Based on target coordinate $x_3$ value, the device of device 4 determines the floor location of the target T.
6. User $U_d$ and device 4 can then proceed to another location such as, for example, to the nearest elevator or stairs. At the same time, device 4 determines the direction of user $U_d$ movement or angle A relative to coordinate axis "North". If it is necessary to change the direction of motion, device 4 of user $U_d$ calculates the traveled distance values from pedometer or other methods that calculate distance traveled or computational data received from devices 1, 2, and 3 of users $U_a$, $U_b$ and $U_c$ that transmit or otherwise send back to device 4 updated measured distances to the target $R_1$, $R_2$, and $R_3$. User $U_d$ either enters this value into device 4 or and device 4 automatically calculates this distance based on user $U_d$ request. Thereafter, user $U_d$ manually enters into device 4 the new direction of motion and user $U_d$ continues to move. From the measured value of traveled distance and angle A, the user's $U_d$ motion relative to axis "North" the of device 4, new coordinate pairs can be determined according to equations (11), (12), (13) and (14) using procedure $P_3$.
7. As user $U_d$ reaches the elevator or stairs, user $U_d$ can prompt device 4 to store coordinates before moving in a vertical direction.
8. For example, a floor number can be manually entered. As user $U_d$ moves vertically to a desired location or floor where target T is located, user $U_d$ can enter the floor number into device 4 so as to allow for user $U_d$ device 4 with coordinate values $(X_{14}, X_{24}, X_{34}+\text{height between origin floor and end floor})$. Alternatively, other methods of determining the floor number can be utilized.
9. All the while, the other users $U_a$, $U_b$ and $U_c$ are also free to move in the building. As each of the other users $U_a$, $U_b$ and $U_c$ move, they can enter and update coordinate values of devices 1, 2 and 3, respectively, according to any one of steps 6 through 8 above. Advantageously, such continuous updating allows devices 1, 2 and 3 of users $U_a$, $U_b$ and $U_c$, respectively, to determine and calculate new coordinate pairs according to equations (11), (12), (13) and (14) using procedure $P_3$.
10. When user $U_d$ reaches a desired floor, part of step 3 is repeated where $U_d$ sends to the three/four stationary the targets ID code.
11. When any of users $U_a$, $U_b$ and/or $U_c$ reaches a desired floor, step 4 is repeated.
12. When all users $U_a$, $U_b$, $U_c$ and $U_d$ reach the desired floor, user $U_d$ repeats step 5.
13. Based on the $(x_1, x_2, x_3)$ and $(X_{14}, X_{24}, X_{34})$ coordinate values of the target T and user $U_d$, device 4 can further determine the direction of motion toward the target A (angle A) using the process to determine $P_2$ as described above.
14. If there is an obstacle as user $U_d$ moves in a given direction, device 4 of user $U_d$ can process the obstacle if user $U_d$ follows the process, according to any one of steps 6 through 7 above. Also, if user $U_d$ moves only along straight lines and prior to any direction changes user $U_d$ inputs into device 4 the an angle under which user $U_d$ is moving relative to the "North" axis. In this manner, device 4 can calculate and store the user $U_d$ current coordinates.
15. User $U_d$ can repeat steps 3-14 until target T is found.

EXAMPLE (5)

Three Dimensional Mobile Finding

A Single Mobile User and Three Stationary Users Inside a Building

According to another exemplary example of the method of the present invention where a user $U_a$ having device 4 is mobile and searching and or tracking a target T inside a building. The devices 4 is configured with a compass however, a pedometer and altimeter is optional. Moreover, if devices 4 is configured without an altimeter, the search and/or tracking process is configured to rely on three stationary devices 1, 2 and 3 as disposed on users $U_b$, $U_c$ and $U_d$, respectively.

In order to determine the coordinates position of the target T, the following conditions must be satisfied:

1. Each of the mobile devices 1, 2, 3 and 4 disposed on users $U_a$, $U_b$, $U_c$ and $U_d$ establishes a system of coordinates in a plane that is referenced to a coordinate system, for example, four parts of the world (North-South, East-West).
2. The dimensions of the building: Height=A; length=B and width=W are known.
3. Stationary devices 1, 2 and 3 as disposed on users $U_b$, $U_c$ and $U_d$, respectively are positioned in such way that the building itself would be completely located inside the parallelepiped that is formed by users $U_b$, $U_c$ and $U_d$. For example, users $U_b$, $U_c$ and $U_d$ are arranged as following: (1) the dimensions of the building located on one side of the plane passing through users $U_b$, $U_c$ and $U_d$ and (2) devices 1, 2 and 3 are not arranged on a straight line disposed on users $U_b$, $U_c$ and $U_d$. In another example, if the shape of the building is a convex polyhedron, users $U_b$, $U_c$ and $U_d$ can be locate on any of the faces or planes. A convex polyhedron can be defined algebraically as the set of solutions to a system of linear inequalities:

$$mx \leq b \quad (15)$$

where m is a real (s x 3) matrix and b is a real s-vector.

However, users $U_b$, $U_c$ and $U_d$ can move from one face or plane to another as long as all three users $U_b$, $U_c$ and $U_d$ are switching faces or planes at the same time. For example, user $U_b$ planar coordinates are (0, 0, 0); user $U_c$ planar coordinates are (0, B, 0); and user $U_d$ planar coordinates are (W, B, A).

4. After the floor height is established, each device 1, 2, 3 and 4 can calculate the floor height, number of floors, and floor number.
5. Each device 1, 2, 3 and 4 for purposes of this example do not account for distance measurement errors advantageously to improve the speed of locating the target T.
6. User $U_a$ having device 4 is mobile or otherwise is the fourth user that is charged with searching and or tracking a target T inside a building. The devices 4 is configured with a compass however, a pedometer and altimeter is optional.

The following defined terms are used throughout the process description:

R(i)—distance of i-th operator to target,
d—distance traveled (by a particular mobile user);
$x_1$—first coordinate target T
$x_2$—second coordinate target T
$x_3$—third coordinate target T
$X_1(i)$—first coordinate operator i
$X_2(i)$—second coordinate operator i
$X_3(i)$—third coordinate operator i
DA—Device action
P(i)—i-th standard computational procedure
RF ID code—target T identification code.

Procedure 1: To determine the coordinates of the target T; using sphere equations can calculate the position as follows:

$$(x_1-X_{11})^2+(x_2-X_{21})^2+(x_3-X_{31})^2=R_1^2 \quad (1)$$

$$(x_1-X_{12})^2+(x_2-X_{22})^2+(x_3-X_{32})^2=R_2^2 \quad (2)$$

$$(x_1-X_{13})^2+(x_2-X_{23})^2+(x_3-X_{33})^2=R_3^2 \quad (3)$$

By removing the parentheses and subtracting equation (2) from equation (1) we can express $x_2$ through $x_1$ and $x_3$. By removing the parentheses and subtracting equation (3) from equation (2) we can express $x_3$ through $x_1$ when the obtained results of $x_2$ are substituted as $x_1$. Further substitution in equation (1) of the obtained result of $x_3$, we can obtain the dependency of $x_2$ from $x_1$. Further substitution in equation (1) of the obtained result of $x_3$ and the obtained results of $x_2$ we can obtain $x_1$. Finally we can obtain $x_2$ and $x_3$ by substituting the obtained results of values $x_1$ into $x_2$ from $x_1$ dependency and $x_3$ from $x_1$ dependency. We use these points for consecutive substituions in the equation (3). The desired point set of coordinates must satisfy the following conditions: $x_1<B$, $x_2<W$, $x_3<A$, i.e. the target is inside the building.

$$(x_1=T, x_2=(TN+O)/KF, x_3=(L-MT)/K)$$

$$(x_1=T, x_2=(UN+O)/KF, x_3=(L-MT)/K)$$

$$(x_1=T, x_2=(UN+O)/KF, x_3=(L-MU)/K)$$

$$(x_1=T, x_2=(TN+O)/KF, x_3=(L-MU)/K)$$

$$(x_1=U, x_2=(TN+O)/KF, x_3=(L-MU)/K)$$

$$(x_1=U, x_2=(UN+O)/KF, x_3=(L-MT)/K)$$

$$(x_1=U, x_2=(TN+O)/KF, x_3=(L-MT)/K)$$

$$(x_1=U, x_2=(UN+O)/KF, x_3=(L-MU)/K)$$

where:

$$T=(-R+\operatorname{sqrt}(R^2-4QS))/2Q$$

$$U=(-R-\operatorname{sqrt}(R^2-4QS))/2Q$$

$$Q=((KF)^2+N^2+(FM)^2)$$

$$R=((-2(X_{11})(RF)^2+2NO-2KF(X_{21})N-2(F^2)ML+2X_{(31)}(F^2)KM$$

$$S=(O^2-2X_{(21)}KFO+(FL)2-2X_{(31)}L(F^2)K+P$$

$$P=((X_{11})^2+(X_{21})^2+(X_{31})^2-R_1^2$$

$$Q=((KF)^2+N^2+(FM)^2)$$

$$O=(KC-EL)$$

$$N=(EM-KD)$$

$$M=(HF-ID)$$

$$K=(JF-IE)$$

$$L=(FK-IC-FG)$$

$$K=R_2^2-R_3^2$$

$$J=2(X_{33}-X_{32})$$

$$I=2(X_{23}-X_{22})$$

$$H=2(X_{13}-X_{12})$$

$$F=2(X_{22}-X_{21})$$

$$E=2(X_{32}-X_{31})$$

$$D=2(X_{12}-X_{11})$$

$$G=((X_{12})^2+(X_{22})^2+(X_{32})^2-(X_{13})^2-(X_{23})^2-(X_{33})^2)$$

$$C=B-A$$

$$B=R_1^2-R_2^2$$

$$A=((X_{11})^2+(X_{21})^2+(X_{31})^2-(X_{12})^2-(X_{12})^2-(X_{32})^2)$$

The spherical coordinates for device 4 disposed on user $U_d$ can be found using the above formulas and substituting $(x_1, x_2, x_3)$ for $(X_{14}, X_{24}, X_{34})$. Additionally, Procedure 2 can be used to determine according to the process of the present invention by calculating a direction of motion (angle A) toward target T, whereby Angle A is determined relatively to the natural coordinates system "North" axis and is calculated based on the device 4 of mobile user's $U_d$ position and target coordinates, as follows:

$$\cos(A) = (x_2 - X_{24})/R_4 \qquad (16)$$

therefore, $$A = \arccos((x_2 - X_{24})/R_4) \qquad (17)$$

Similarly, a direction of motion of user $U_d$ of device 4 can be calculated by using one or more of the following steps:

If Angle A>90 & $x_1 < X_{14}$ then device 4 instructs and or displays "(180-A) degrees in South-West" direction to user $U_d$.

If Angle A>90 & $x_1 > X_{14}$ then device 4 instructs and or displays "(180-A) degrees in South-East" direction to user $U_d$.

If Angle A<90 & $x_1 < X_{14}$ then device 4 instructs and or displays "A degrees in North-West" direction to user $U_d$.

If Angle A<90 & $x_1 > X_{14}$ then device 4 instructs and or displays "[A] degrees in North-East" direction to user $U_d$.

The process of a search consists of the establishing the following steps:

1. If the distance $R_4$ to target T exceeds a predetermined threshold "D", $R_4 > D$, then monitoring unit notifies user $U_d$ of this condition by displaying <<Search mode>> else <<Monitoring mode>> (where D—distance threshold).
2. Otherwise, the monitoring unit notifies user $U_d$ that <<Search mode>> is ON.
3. Device action DA: Device 4 stores the target ID code to itself (device 4 of user $U_d$) and sends the target ID code to three stationary monitoring units devices 1, 2, and 3 of users $U_a$, $U_b$ and $U_c$, respectively.
4. Device action of DA for Devices 1, 2, and 3 of users $U_a$, $U_b$ and $U_c$:
   a) Device action DA: Devices 1, 2, and 3 of users $U_a$, $U_b$ and $U_c$ perform a distance measurement to target T identified by device 4 of user $U_d$ in step (3) so as to determine distances to the target $R_1$, $R_2$, and $R_3$.
   b) Device action DA: Devices 1, 2, and 3 of users $U_a$, $U_b$ and $U_c$ transmit or otherwise send back to device 4 of user $U_d$ measured distances to the target $R_1$, $R_2$, and $R_3$, which can be represented as distance R(i) values, where i is 1-3 having coordinates values $(X_{11}, X_{21}, X_{31})$, $(X_{12}, X_{22}, X_{32})$, $(X_{13}, X_{23}, X_{33})$.
5. Device action DA: Device 4 calculates the target coordinates: $(x_1, x_2, x_3)$ using $P_1$ and determines floor location of target T.
   a) Using $P_1$ the device 4 calculates the target coordinates: $(x_1, x_2, x_3)$, which is based on the above information: $R_1$, $R_2$, $R_3$ the coordinates of mobile devices 1, 2, 3 disposed on users $U_a$, $U_b$, $U_c$ $(X_{11}, X_{21}, X_{31})$, $(X_{12}, X_{22}, X_{32})$, $(X_{13}, X_{23}, X_{33})$
   b) Using P1 the operator 4 device calculates its own coordinates $(X_{14}, X_{24}, X_{34})$, and the floor, which is based on distances between stationary operatiors 1-3 and operator 4: $R_1$, $R_2$, $R_3$ the coordinates of stationary devices 1, 2, 3 disposed on users $U_a$, $U_b$, $U_c$ $(X_{11}, X_{21}, X_{31})$, $(X_{12}, X_{22}, X_{32})$, $(X_{13}, X_{23}, X_{33})$.
   c) Based on target coordinate $x_3$ value, the device of device 4 determines the floor location of the target T.
6. User $U_d$ and device 4 can then proceed to another location such as, for example, to the nearest elevator or stairs.
7. User $U_d$ reaches desired floor, where target T is located.
8. While user $U_d$ is on the desired floor, paragraph 3 is repeated.
9. Users $U_a$, $U_b$ and/or $U_c$ repeat step 4.
10. User $U_d$ device 4 repeats paragraph 5.
11. Based on the $(x_1, x_2, x_3)$ and $(X_{14}, X_{24}, X_{34})$ coordinate values of the target T and user $U_d$, device 4 can further determine the direction of motion toward the target A (angle A) using the process P2 to determine the direction of motion towards the target (angle A relative to the North Axis) as described above.
12. If there is an obstacle as user $U_d$ moves in a given direction, $U_d$ simply bypasses it and then repeats steps 3-6.
13. User $U_d$ can repeat steps 3-13 until target T is found.

EXAMPLE (6)

Of Three Dimensional Mobile Finding

A Single Mobile User and Two Stationary Users Inside a Building

According to another exemplary example of the method of the present invention where a user $U_a$ having device 1 is mobile and searching and or tracking a target T inside a building. Two devices 2 and 3 disposed on users $U_b$ and $U_c$ are located vertically, i.e. one operator is above other. This method is a derivative method based on the first example of finding according to the present invention.

Figure 5:
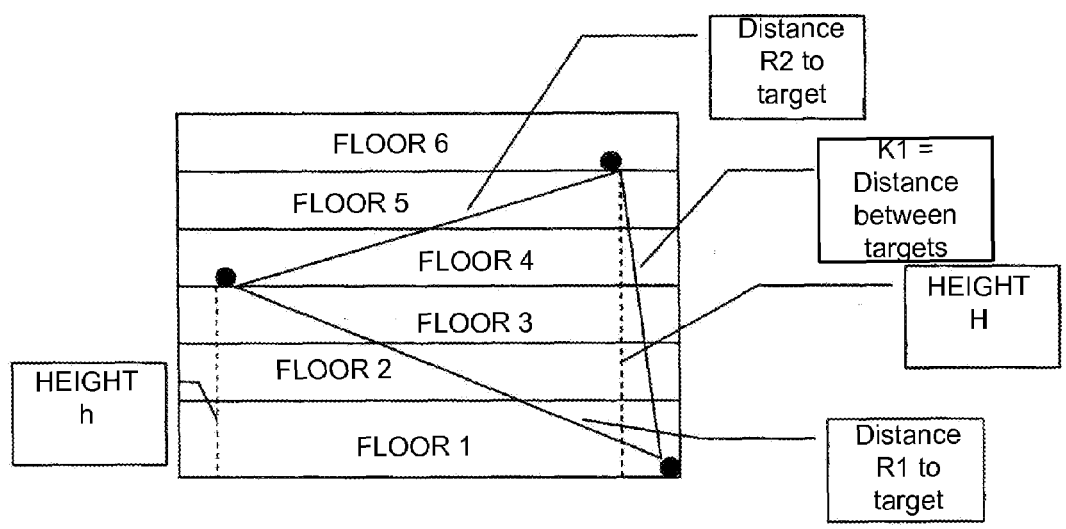
FIG. 5 is a schematic diagram illustrating a method of the tracking and locating system to determine the position of the units using spherical coordinates.

In order to determine the coordinates of the target T; the following conditions must be satisfied:

1. Each of the devices 1, 2 and 3 disposed on users $U_a$, $U_b$, and $U_c$ so as to establish a system of coordinates in a plane that is referenced to a coordinate system, for example, four parts of the world (North-South, East-West). As shown in FIG. 5 devices 2 and 3 disposed on users $U_b$ and $U_c$ are positioned in such way that one is above the other.
2. The total floor height is known or can be estimated, as well as the height of each floor.
3. Each of the devices 2 and 3 are configured with their floor and coordinates.
4. It is assumed that user Ua is the monitoring master unit that is searching and or tracking the target T. Device 1 of user Ua is configured with a compass, altimeter and pedometer or can get the information such devices provide from another source.
5. The targets T are equipped with an altimeter.

The following defined terms are used throughout the process description:

R(i)—distance of i-th operator to target,
d—distance traveled (by a particular mobile user)
$x_1$—first coordinate target T
$x_2$—second coordinate target T
$x_3$—third coordinate target T
$X_1(i)$—first coordinate operator i
$X_2(i)$—second coordinate operator i
$X_3(i)$—third coordinate operator i
DA—Device action
Rp(i)—distance between projections of operator (i) and target T.
P(i)—i-th standard computational procedure
RF ID code—target T identification code.

The coordinates of the target T can be calculated Procedure 1 and Procedure 2 can be determined according to the method of the present invention where:

Procedure 1 is:

$$R_{pi} = \text{sqr}(\text{sqrt}(R_i) - \text{sqrt}(X_{3(i)} - X_3)) \quad (18)$$

Procedure 2: the coordinates calculations for Target is found by:

$$(x_1 - X_{11})^2 + (x_2 - X_{21})^2 = R_{p1}^2 \quad (19)$$

$$(x_1 - X_{12})^2 + (x_2 - X_{22})^2 = R_{p2}^2 \quad (20)$$

$$(x_1 - X_{13})^2 + (x_2 - X_{23})^2 = R_{p3}^2 \quad (21)$$

Remove the parentheses and subtract equation (20) from (19) solutions for $x_1$ and $x_2$ can be found as follows:

$$x_1 = A - (B*(D +/- \text{sqrt}(D^2 - C*E))/C) \quad (22)$$

$$x_2 = (D +/- \text{sqrt}(D^2 - C*E))/C \quad (23)$$

where $$A = (R_{p1}^2 - R_{p2}^2 - ((X_{11})^2 - (X_{12})^2) - ((X_{21})^2 - (X_{22})^2))/2*(X_{12} - X_{11})$$

$$B = (X_{22} - X_{21})/(X_{12} - X_{11}))$$

$$C = 1 + B^2$$

$$D = A*B + X_{21} - B*X_{11}$$

$$E = A^2 - 2*A*X_{11} + X_{21}^2 + X_{11}^2 - R_{p1}^2.$$

As a result, four points are obtained and are used for consecutive substitutions in equation (23). The desired point set of coordinates will turn equation (23) into equality.

Procedure 3: Calculation of searching monitoring device 1 and a direction of motion (angle A) toward target T is determined relatively to the natural coordinates system "North" axis and is calculated based on the mobile operator and target coordinates:

$$\cos(A) = (x_2 - X_{2(1)})/R_{p1} \quad (24)$$

therefore, $$A = \arccos((x_2 - X_{2(1)})/R_{p1}) \quad (25)$$

user $U_a$ having device 1 in the searching and/or can update its position by calculating a d value—the distance between the projections of the points into the natural coordinate plane and new positions of user $U_a$ having device 1 (after the user $U_a$ moves for a certain distance, as follows:

$$d = \text{sqr}(1 - \text{sqrt}(X_{3(i)}\text{new} - X_{3(i)})) \quad (26)$$

Thereafter, four cases are possible according to the number of possible directions of movement. Accordingly, for every possible direction of movement enumerated above, the coordinates of user $U_a$ having device 1 in the searching and/or after the after the user $U_a$ moves for a certain distance in suggested direction.

1. $X_{1(i)new} = X_{1(i)} - \sin(A)*d, X_{2(i)new} = X_{2(i)} - \cos(A)*d$ (27)

2. $X_{1(i)new} = X_{1(i)} + \sin(A)*d, X_{2(i)new} = X_{2(i)} - \cos(A)*d$ (28)

3. $X_{1(i)new} = X_{1(i)} - \sin(A)*d, X_{2(i)new} = X_{2(i)} + \cos(A)*d$ (29)

4. $X_{1(i)new} = X_{1(i)} + \sin(A)*d, X_{2(i)new} = X_{2(i)} + \cos(A)*d$ (30)

Similarly, a direction of motion of user $U_a$ of device 1 can be calculated by using one or more of the following steps:

If Angle A>90 & $x_1 < X_{1(1)}$ then device 1 instructs and or displays "(180-A) degrees in South-West" direction to user $U_a$.

If Angle A>90 & $x_1 > X_{1(1)}$ then device 1 instructs and or displays "(180-A) degrees in South-East" direction to user $U_a$.

If Angle A<90 & $x_1 < X_{1(1)}$ then device 1 instructs and or displays "A degrees in North-West" direction to user $U_a$.

If Angle A<90 & $x_1 > X_{1(1)}$ then device 1 instructs and or displays "A degrees in North-East" direction to user $U_a$.

The process of a search consists of the establishing the following steps:

1. Monitoring device 1 is periodically measuring distance $R_1$ to target. If the distance to target exceeds a predetermined threshold "D", the device will notify monitoring operator.
2. Monitoring device 1 enabled in a search/track mode transmits the target ID code of the target T to be searched for and/or tracked, transmits the target ID code of the target T to other two monitoring devices (device 2 and device 3).
3. Monitoring devices 2 and 3 determines the corresponding distances to the target, i.e. $R_2$ and $R_3$, devices 2 and 3 height values ($X_{32}$, $X_{33}$) and devices 2 and 3 coordinates (on the plane) values ($X_{21}$, $X_{22}$), ($X_{31}$, $X_{32}$)
4. The first monitoring device 1 sends a request to the target T to read the altimeter value (the target's height).
5. Target T device will transmit to first monitoring device the target "height", i.e. $x_3$.
   a. If the target is on a different floor ($X_{31}$ is not equal $x_3$), user $U_a$ of device 1 proceeds to the nearest elevator or stairs; at the same time device 1 of user $U_a$ determines the direction of the operator movement (angle A of user $U_a$ motion relative to axis "North"). If it is necessary to change the direction of motion, user $U_a$ calculates the distance traveled and either enters this value into device 1 or device 1 automatically calculates this distance based on the user $U_a$ request. Thereafter, user $U_a$ enters into device 1 the new direction of motion and continues to move. From the traveled distance value and the angle A of user $U_a$ motion relative to axis "North" the operator's device, using procedure $P_4$, will determine user $U_a$ new coordinates.
   b. As user $U_a$ reaches elevator or stairs and prompts device 1 to store user $U_a$ coordinates before moving in vertical direction.
   c. As user $U_a$ moves vertically on to desired floor, where target T is located, user $U_a$ device 1 automatically calculates the floor number
6. DA user $U_a$ device 1:
   a. Using procedure P1, user $U_a$ device 1 calculates $R_{p1}$, $R_{p2}$, and $R_{p3}$ based on $R_1$, $R_2$, $R_3$, (($X_{11}$), $X_{21}$), $X_{31}$)), (($X_{12}$), $X_{22}$), $X_{32}$)) and (($X_{13}$), $X_{23}$), $X_{33}$)) values.
   b. Using procedure P2, calculates target coordinates ($x_1$, $x_2$ on the plane) values based on $R_{p1}$, $R_{p2}$, and $R_{p3}$ and (($X_{11}$), $X_{21}$), $X_{31}$)), (($X_{12}$), $X_{22}$), $X_{32}$)) and (($X_{13}$), $X_{23}$), $X_{33}$)) values.
   c. Using procedure P3, calculates operator 1 direction of motion (angle A) toward target based on (($X_{11}$), $X_{21}$)), ($x_1$, $x_2$) values. The Angle A, is determined relatively to the natural coordinates system "North" axis.
   d. The newly calculated angle A value is stored in the device.
   e. Provides graphical prompt to operator.

7. User $U_a$ device 1 begins movement in a given direction. For accurate determination of user $U_a$ coordinates, user $U_a$ device, after operator moved a certain distance uses procedure P4 and altimeters readings to update the user $U_a$ coordinates.
   a. Stores user $U_a$ updated (new) coordinates values.
8. User $U_a$ device 1 repeats paragraphs 3-7 until target T is found.

The moment for user $U_a$ device 1 coordinates update "operator moved a certain distance" is calculated when from the following:

$$\text{sqr}(\text{sqrt}(X_{11previous}-X_{11new})+\text{sqrt}(X_{21previous}-X_{21new})) > \text{(Predetermined distance)} \quad (31)$$

For example, the predetermined distance value could be set to 10 meters.

Although exemplary embodiments of the present invention have been shown and described with reference to particular embodiments and applications thereof, it will be apparent to those having ordinary skill in the art that a number of changes, modifications, or alterations to the invention as described herein may be made, none of which depart from the spirit or scope of the present invention. For example, the process can be embodied in software that resides on some form of electronic device and/or related circuitry. The device can be implemented in a circuitry adapted for a cellular telephone, a PDA, a portable computer, a two-way radio, a GPS device, a custom electronic device, whereby the devices utilize the software to communicate with each other to determine the location of all of the devices within range of each other and/or the network. All such changes, modifications, and alterations should therefore be seen as being within the scope of the present invention.

We claim:

1. An RF system for finding a target T in three dimensional space, comprising:
   a slave unit disposed on the target T, said slave unit configured as a transponder;
   a monitoring unit configured as a transceiver for monitoring the location of the target T;
   a wireless communication system, said wireless communication system operating on a Radio Frequency (RF) bandwidth configured to allow communication between said slave and monitoring units, said monitoring unit configured to transmit a ranging signal to said slave unit, said slave unit responding to said ranging signal by transmitting a reply ranging signal, said wireless communication system further comprising:
   a processor for determining position information of the target T, said processor in communication with an antenna, said processor being configured to repeatedly determine values for said position information from:
   means for determining a transmission interval between said monitoring unit and said slave unit, said transmission interval being an elapsed time between transmitting said ranging signal and receiving said reply ranging signal,
   means for determining a calibration interval between each of said monitoring unit and slave unit said calibration interval being a time interval of a period to normalize the circuitry of said monitoring and slave units, and
   means for determining an antenna propagation interval of said units, said antenna propagation interval being an elapsed time of a signal measured as it passes through said antenna of said monitoring and slave units,
   and
   means for generating a measured distance between units in three dimensional space, said distance generating means determining said measured distance of the target T by a spherical virtual triangulation relationship when successive values of said position information has a predetermined logical relationship relative to said previous values between said monitoring unit and slave unit.

2. The system according to claim 1, wherein said processor configured to determine said spherical virtual triangulation relationship based on said position information values from at least three points $P_1$, $P_2$ and $P_3$ determined for said target T respective of said monitoring unit, said target T is located utilizing the point of intersection of at least three circles based on values of said position information relating to said points $P_1$, $P_2$ and $P_3$, whereby said points $P_1$, $P_2$ and $P_3$ have circles with radii $R_1$, $R_2$ and $R_3$ respective of said monitoring unit to said target T.

3. The system according to claim 2, wherein said processor is configured to determine said spherical virtual triangulation relationship based on measuring the value of each of said points $P_1$, $P_2$ and $P_3$ not in a straight line relative to said monitoring unit to reduce ambiguity, each measurement of the value of said radii $R_1$, $R_2$ and or $R_3$ to pinpoint the target T utilizing a position of said monitoring unit.

4. A method for finding a target in three dimensional space, comprising the steps of:
   determining three spheres between successive readings between one of a transponder disposed on the target T and a transceiver each operating using radio frequency (RF), said spheres determined by successive readings each having centers that do not lie on one straight line;
   numbering three separate points of an intersection of said spheres as equal either to zero or one, or two; and
   calculating a position of the target T from the information of said number of points.

* * * * *